United States Patent
Liaw et al.

(10) Patent No.: US 9,063,597 B2
(45) Date of Patent: Jun. 23, 2015

(54) STYLUS AND TOUCH INPUT SYSTEM

(71) Applicant: INTEGRATED DIGITAL TECHNOLOGIES, INC., Hsinchu (TW)

(72) Inventors: Shen-Tai Liaw, Hsinchu (TW); Nae-jye Hwang, Hsinchu (TW); Feng-Sheng Lin, Hsinchu (TW); Chih-Ming Yuan, Hsinchu (TW)

(73) Assignee: INTEGRATED DIGITAL TECHNOLOLGIES, INC., Hsinchu (TW)

( * ) Notice: Subject to any disclaimer, the term of this patent is extended or adjusted under 35 U.S.C. 154(b) by 297 days.

(21) Appl. No.: 13/718,862

(22) Filed: Dec. 18, 2012

(65) Prior Publication Data

US 2013/0100087 A1 Apr. 25, 2013

Related U.S. Application Data

(62) Division of application No. 12/984,613, filed on Jan. 5, 2011.

(60) Provisional application No. 61/293,209, filed on Jan. 8, 2010.

(51) Int. Cl.
| | |
|---|---|
| G06F 3/033 | (2013.01) |
| G06F 3/041 | (2006.01) |
| G06F 3/0354 | (2013.01) |
| G06F 3/038 | (2013.01) |
| G06F 3/042 | (2006.01) |

(52) U.S. Cl.
CPC ............ *G06F 3/041* (2013.01); *G06F 3/03545* (2013.01); *G06F 3/0386* (2013.01); *G06F 3/033* (2013.01); *G06F 3/042* (2013.01)

(58) Field of Classification Search
CPC ................................ G06F 3/033; G06F 3/042
USPC ..................... 345/173–184; 178/18.01–20.04
See application file for complete search history.

(56) References Cited

U.S. PATENT DOCUMENTS

| | | | |
|---|---|---|---|
| 4,111,052 | A | 9/1978 | Sniderman |
| 5,565,632 | A | 10/1996 | Ogawa |
| 5,581,052 | A | 12/1996 | Padula et al. |
| 5,633,471 | A | 5/1997 | Fukushima |
| 6,262,684 | B1 | 7/2001 | Stewart et al. |
| 6,441,362 | B1 | 8/2002 | Ogawa |
| 7,348,968 | B2 | 3/2008 | Dawson |
| 7,439,969 | B2 | 10/2008 | Chithambaram et al. |
| 7,525,078 | B2 | 4/2009 | Fann |
| 7,960,679 | B2 | 6/2011 | Fann |
| 8,184,109 | B2 | 5/2012 | Fukushima et al. |
| 2002/0070927 | A1* | 6/2002 | Fujitsuka et al. ............. 345/179 |

(Continued)

*Primary Examiner* — Kumar Patel
*Assistant Examiner* — Vinh Lam
(74) *Attorney, Agent, or Firm* — Steptoe & Johnson LLP

(57) ABSTRACT

A touch input system including a stylus and a display device is provided. The stylus includes a battery module, a touch portion, a transducer module and a RF transmitting module. When a contact pressure is acted on the touch portion, the touch portion is electrically connected to the battery module by the contact pressure and emits a light signal. The display region receives and reacts to the light signal, and the contact pressure is transformed into an electrical signal by the transducer module. The RF transmitting module is electrically connected to the transducer module and transmitting the electrical signal. The display device includes a display region and a RF receiving module.

7 Claims, 11 Drawing Sheets

(56) References Cited

U.S. PATENT DOCUMENTS

| | | |
|---|---|---|
| 2003/0132923 A1 | 7/2003 | Hu |
| 2003/0146906 A1* | 8/2003 | Lin .................... 345/179 |
| 2005/0052435 A1* | 3/2005 | Cho et al. ............ 345/182 |
| 2005/0116940 A1 | 6/2005 | Dawson |
| 2005/0156915 A1* | 7/2005 | Fisher .................. 345/179 |
| 2007/0080282 A1 | 4/2007 | Fann |
| 2007/0080956 A1 | 4/2007 | Fann |
| 2007/0165007 A1 | 7/2007 | Morrison et al. |
| 2008/0087796 A1 | 4/2008 | Fann |
| 2008/0252621 A1* | 10/2008 | Shipton ................ 345/179 |
| 2008/0278462 A1 | 11/2008 | Chang |
| 2009/0114459 A1 | 5/2009 | Fukushima et al. |
| 2009/0167728 A1* | 7/2009 | Geaghan et al. ..... 345/179 |
| 2010/0001962 A1 | 1/2010 | Doray et al. |
| 2010/0020044 A1 | 1/2010 | Abileah et al. |
| 2011/0007001 A1 | 1/2011 | Liu |
| 2011/0043492 A1 | 2/2011 | Elsasser et al. |
| 2012/0019488 A1 | 1/2012 | McCarthy |

* cited by examiner

STYLUS AND TOUCH INPUT SYSTEM

CROSS-REFERENCE TO RELATED APPLICATION

This application is a divisional of U.S. application Ser. No. 12/984,613, filed Jan. 5, 2011, which claims the benefit of prior U.S. Provisional Application No. 61/293,209, filed on Jan. 8, 2010, each of which are incorporated by reference in their entirety.

BACKGROUND OF THE INVENTION

1. Field of the Invention

The present invention generally relates to a touch input system. More particularly, the present invention relates to an input device suitable for emitting light and a touch screen using the input device.

2. Description of Related Art

Display panels traditionally serve the role of displaying the information or the output from a system, while other input device or devices provide inputs to the system. Interactive devices, such as a touch panel that can receive a user's input via touching the display panel, combines both output and input functions and allow a user to interact with the display or the system coupled to the display. As an example, devices such as personal digital assistants (PDAs), mobile phones, personal computers (PCs), tablet PCs, etc. have incorporated touch panels for providing users with more input choices.

Conventional touch panels or touch screens have a number of different designs, such as resistive type, surface-wave type, capacitive type, and infrared-ray type designs. All of these designs typically require combining a display device with a separate touch panel sheet. No matter what type of touch panel, it tries to provide a more convenient way for users, for example, the resistive type, surface-wave type, capacitive type, and infrared-ray type touch panel are operated by users' fingers or stylus. The in-cell type optical touch display panels could be operated by light or shadow, and the touch position is located by photo sensors designed in the in-cell type display panel. Therefore, touch display panel includes a display panel suitable for sensing a light signal emitted or blocked by a stylus to be operated. When a optical pen used as a positional indicator of the in-cell type optical touch display panel, the display panel is capable of displaying a line according to the light signal emitted by the stylus. Several arrangements have been proposed for an optical pen which has a pressure sensitive mechanism, and allowed to produce a certain change when the pen pressure was applied thereto.

SUMMARY OF THE INVENTION

The present invention is to provide a touch input system, including a input device and a display device.

The present invention is to provide a stylus suitable for sensing the depressing force by its pressure sensitive mechanism disposed in the tip of the stylus. The stylus includes a main body and a touch portion, wherein the main body comprises a pressure sensing mechanism, a transducer module, an RF transmitting module, and a battery module. The touch portion is disposed at the front of the main body, and is suitable for contacting with the operation surface.

As embodied and broadly described herein, the present invention provides a touch input system including an optical stylus and a display device for locating the touch position by the optical stylus. The stylus includes a main body and a touch portion capable of emitting light, wherein the main body comprises a transducer module, a RF transmitting module, and a battery module. The touch portion disposed at the front end of the stylus is electrically connected to the battery module by the contact pressure and emits a light signal continuously when a contact pressure is acted on the touch portion. The display device includes a display region, and a RF receiving module essentially consisted of a RF receiver and a built-in antenna. The RF receiver is electrically connected to the display region and the built-in antenna receives the electrical signal within a predetermined frequency range.

Some example of the present invention may provide a stylus including a housing and a touch portion. The housing has a front end, a back end opposite to the front end and an opening formed at the front end. The touch portion is sliding disposed at the opening along an axis, wherein the touch portion is suitable for contacting an operation surface to move into the housing. The housing has a capacity of a battery module and a detector; in some cases, it further comprises a transducer module and a RF transmitting module. A blocking plate is disposed in the middle of the housing of the stylus, and is disposed between the battery module and an elastic element. The detector is fixed to the blocking plate and used for detecting a motion of the touch portion to obtain an analog signal. The elastic element and the touch portion is located on the axis of the housing, wherein the elastic element is fixed on the blocking plate and the touch portion is sliding disposed at the opening, such that the touch portion contacts the operation surface to move into the housing, the elastic element is compressed between the blocking plate and the touch portion. The touch portion is electrically connected to the battery module and emits a light signal continuously while writing. However, the touch portion is recovered by an elastic force of the elastic element when the touch portion is distant from the operation surface. Meanwhile, the electrical connection between the touch portion and the battery module is terminated.

Another example of the present invention may provide a stylus including a pipe, a touch portion, a first magnetic element and a second magnetic element. The pipe has a front end, a back end opposite to the front end and an opening formed at the front end, wherein a diameter of the opening is smaller than a diameter of the pipe. The touch portion is sliding disposed at the opening, and at least a part of the touch portion is located in the pipe. The first magnetic element is disposed in the pipe and having a through hole, and a diameter of the through hole is not less than the diameter of the opening. Therefore, the second magnetic element is fixed to the touch portion located in the pipe, and the first magnetic element is located between the second magnetic element and the opening. The second magnetic element is driven to move away from the first magnetic element when the touch portion is driven to move toward the back end by a force resisting a magnetic attractive force generated between the first magnetic element and the second magnetic element.

Another example of the present invention may provide an input device including a pipe, a touch portion, a protrusion and a switch element. The pipe has a front end, a back end opposite to the front end and an opening formed at the front end, wherein a diameter of the opening is smaller than a diameter of the pipe. The touch portion is sliding disposed at the opening, and a part of the touch portion is located in the pipe. The protrusion, the switch element and the touch portion are on the central axis of the stylus. The switch element is fixed and electrically connected to the touch portion and has an elastic element to provide an elastic force for recovery. When the touch portion is driven to move toward the back end by a depressing force, the switch element is also driven to contact the protrusion for actuating the touch portion to emit a light signal continuously, and the elastic element is compressed between the touch portion and the protrusion.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
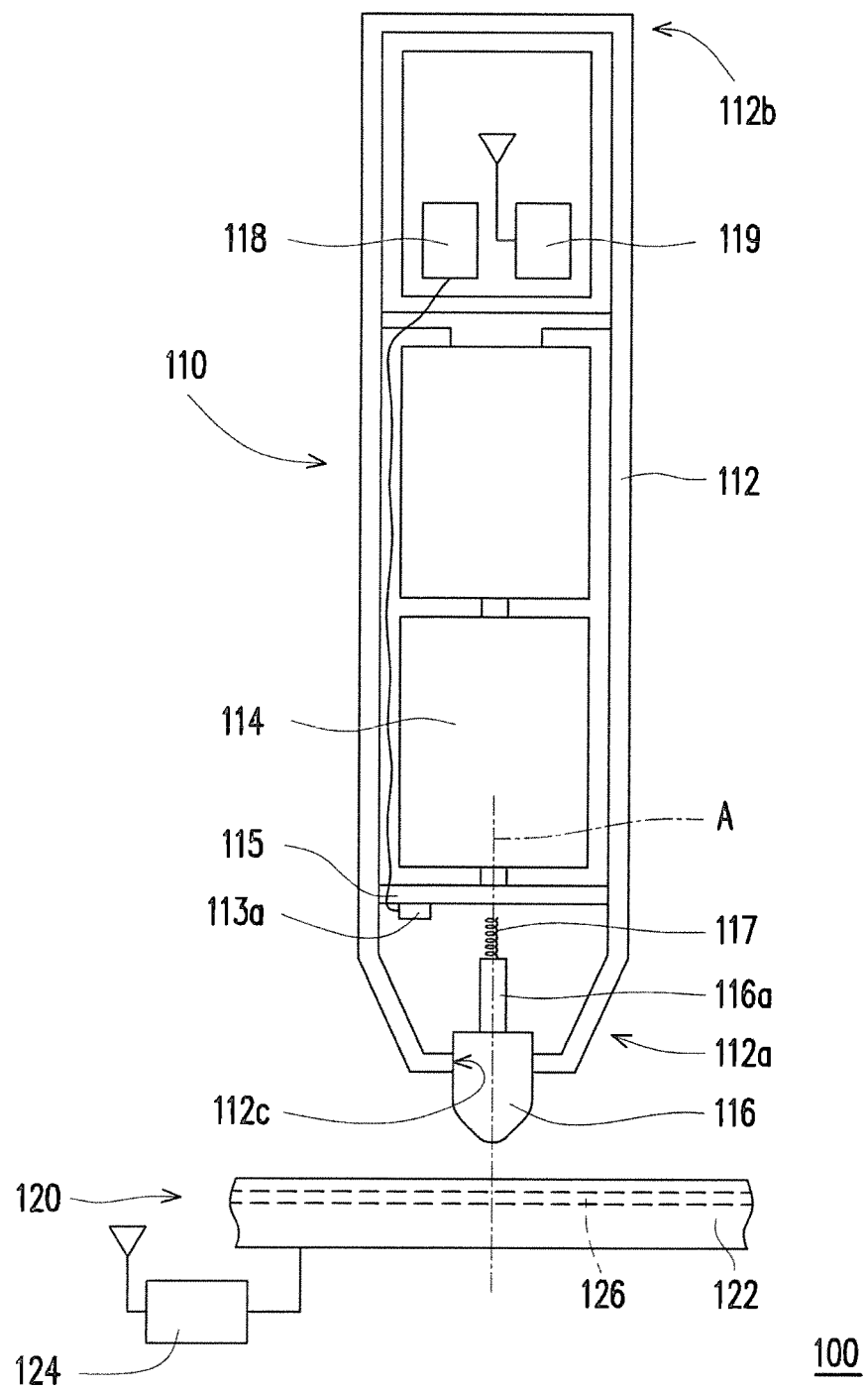
FIG. 1 illustrates a touch input system according to an embodiment of the present application.

Reference will now be made in detail to the present embodiments of the invention, examples of which are illustrated in the accompanying drawings. Wherever possible, the same reference numbers are used in the drawings and the description to refer to the same or like parts.

Figure 2:
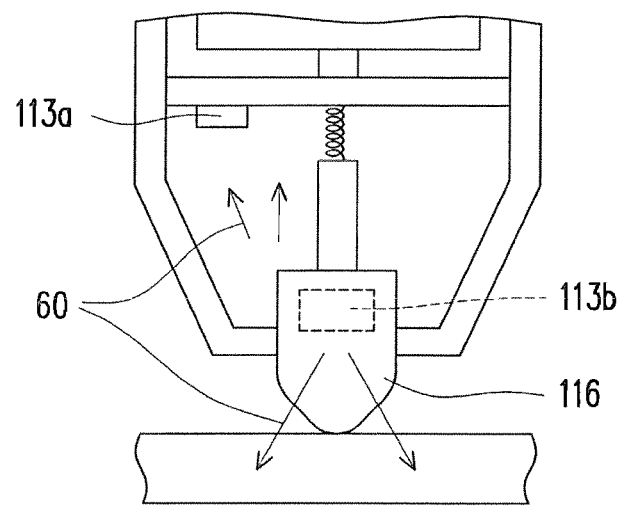
FIG. 2 partially illustrates a stylus during exerting according to an embodiment of FIG. 1.

FIG. 1 illustrates a touch input system according to an embodiment of the present application. FIG. 2 illustrates the touch portion contacts the display region of FIG. 1. Referring to FIG. 1, the touch input system 100 includes a stylus 110 and a display device 120. The stylus 110 has a two-terminal main body 112 including a front end 112a and a back end 112b, wherein the front end 112a is separated by a blocking plate 115. The main body 112 comprises a transducer module 118 and an RF transmitting module 119, and a battery module 114. The blocking plate 115 is disposed between the battery module 114 and an elastic conductor 117. The front end 112a has an opening 112c at the pen tip, and the touch portion 116 is sliding disposed in the opening 112c along an axis A. The touch portion 116 may have a pillar 116a to extend into the front end 112a, and the pillar 116a, the elastic conductor and the touch portion 116 are all on the axis A. The axis A is perpendicular to the blocking plate 115 and pass through the center of the stylus 110. An elastic conductor 117, such as a metal spring or a conducting sponge, is directly connected to the touch portion 116 or via pillar 116a, depending on the function of the stylus. Whether the elastic conductor 117 is fixed to the pillar 116a or the blocking plate 115, the pillar 116a is disposed between the touch portion 116 and the elastic conductor 117, and they all move along the axis A. Taking FIG. 1 for example, the three elements on the axis A, including the touch portion 116, the pillar 116a and the elastic conductor 117, can be regarded as a switch for lighting up the touch portion 116. The touch portion 116 can be a light emitting diode (LED), a light bulb, a laser, and so on. The transducer module is used for transforming the contact pressure into an electrical signal by the transducer module, and the electrical signal is directly proportional to the contact pressure depressed by a user. The RF transmitting module is electrically connected to the transducer module, and sending the electrical signal to a RF receiving module embedded in the display device. The RF transmitting module is essentially consisted of a RF transmitter and an antenna for transmitting depressing pressure information.

Referring to a display device 120, it includes a display region 122 with an operation surface of the display device 120 and an RF receiving module 124. The display device 120 further includes a light sensor array 126 arranged in a pixel electrode array of the display region 122. Examples of the light sensor array may be found in but are not limited to commonly assigned applications, i.e., U.S. patent application Ser. No. 11/536,403, "Interactive Display Devices and Methods of Making the Same," filed Sep. 28, 2006, and U.S. patent application Ser. No. 11/777,887, "Photo Detector Array with Thin-Film Resistor-Capacitor Network," filed Jul. 13, 2007, which is a continuation-in-part of U.S. patent application Ser. No. 11/534,680, "Photo Detector Array," filed Sep. 25, 2006. Other sensor elements capable of supporting a touch panel based on a pressure source or a non-touch panel based on an optical source may also be applicable to the present invention. In one example, the display device 120 may include but is not limited to one of a photo-sensing panel, an organic light-emitting diode (OLED) panel and a low temperature poly silicon (LTPS) panel. Accordingly, the display region of the display device 120 not only receives the light signal emitted by the optical stylus, but also reacts to the depressing pressure exerted onto the display region. The RF receiving module 124 embedded in the display device 120 is essentially consisted of a receiving antenna and a RF receiver.

FIG. 2 partially illustrates a stylus during exerting against the display device according to an embodiment of FIG. 1. The light detector 113a is suitable for detecting a light 60 emitted by the light emitting element 113b to obtain a variation of a distance between the light emitting element 113b and the light detector 113a, wherein the above-mentioned distance is shortened while the contact pressure acted on the touch portion 116 is increased. The light detector 113a is, for example, a photo transistor, a photo diode or a photo-sensitive resistor. The light emitting element 113b preferably provides a wavelength that the light detector 113a is sensitive to. The light 60 is detected by the light sensor array 126 for locating touch position, and simultaneously provided information for pressure strength operated by the user. One skilled in the art will appreciate that the light 60 is not restricted to a visible light, other electromagnetic wave, such as infrared light, ultraviolet light or other radiation, can be sensed by the light detector 113a and the light sensor array 126 are favorable options. Referring to FIG. 1 and FIG. 2, the touch portion 116 is exerted on the working plane, such as display device 120, when a user is writing by the stylus 110. The elastic conductor 117 would be compressed and electrically contact with the battery module 114, such that the touch portion 116 emits the light 60. The light sensor array 126 embedded in the display device 120 is capable of locating the touch position by sensing the light 60, but the line width depicted by a user can not be shown. The detector 113a is connected with the transducer module 118, and electrically connected with the battery module 114. The detector 113a receives differential light amount in accordance with distance between the touch portion 116 and the detector 113a when the user is operating the stylus 110. The distance between the touch portion 116 and the detector 113a is inverse proportional to the depressing force from the user, and the light sensed by the detector 113a will be converted to an analog signal. The analog signal can be transmitted to the transducer 118, and converted to a digital signal.

Figure 3:
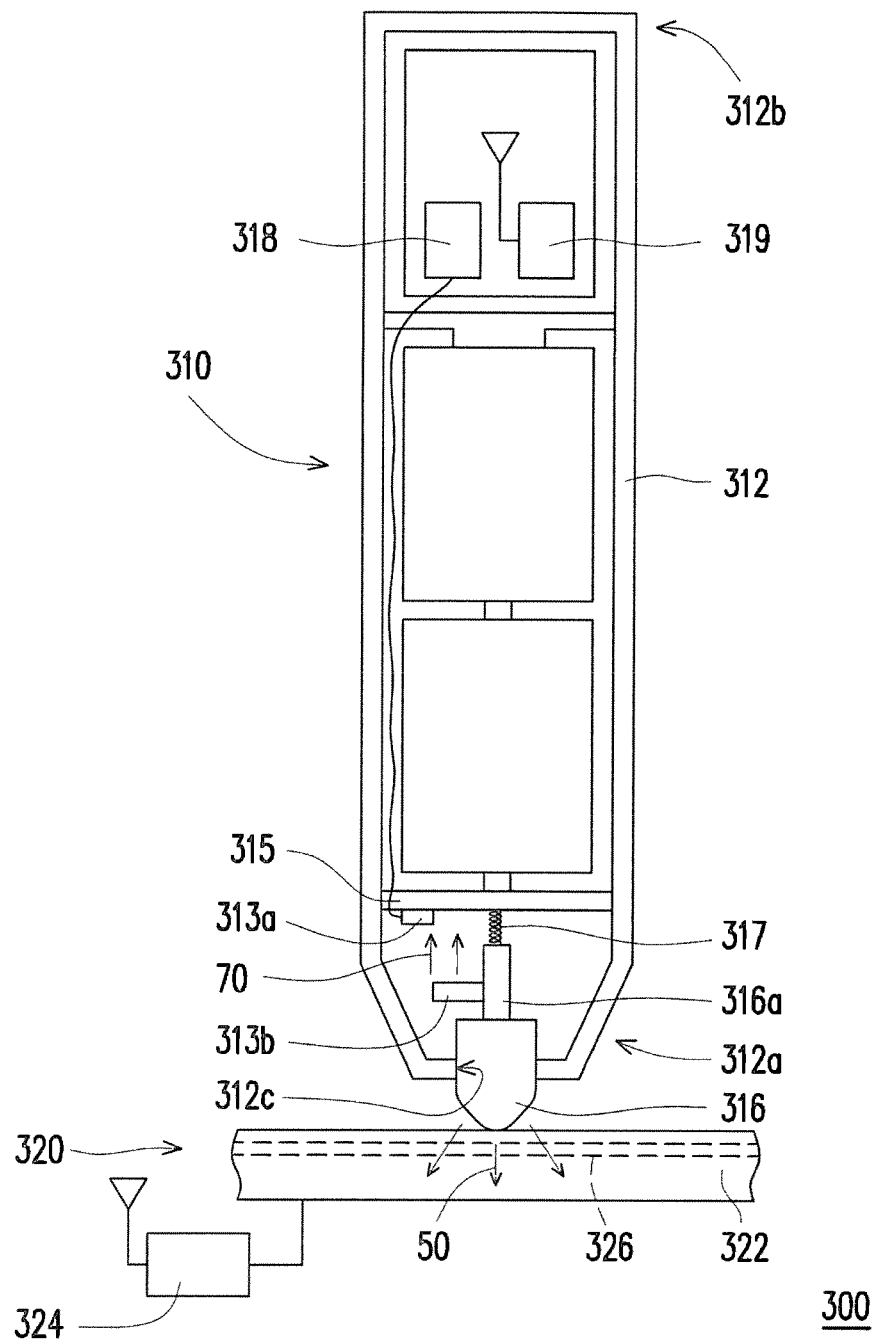
FIG. 3 illustrates a touch input system according to another embodiment of the present application.
Figure 4:
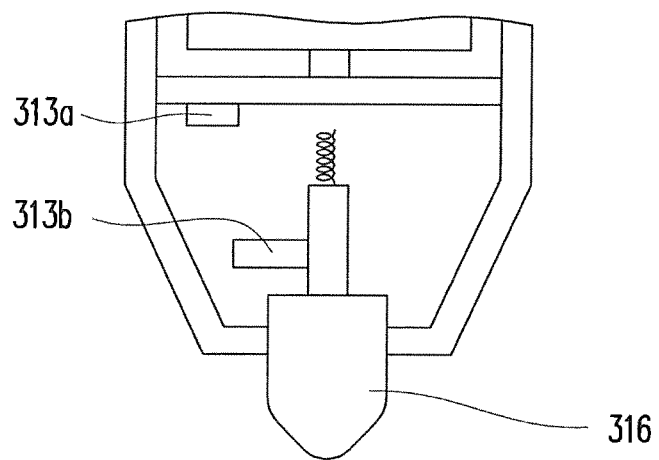
FIG. 4 partially illustrates a tip of the stylus leaves the operation surface.

FIG. 3 is a schematic view illustrating another embodiment of the present application. The main body 312 is, for example, a housing having a front end 312a, a hack end 312b opposite to the front end 312a and an opening 312c formed at the front end 312a, wherein the touch portion 316 is sliding disposed at the opening 312c along an axis A. The battery module 314 is disposed in the main body 312, and separated from the front end 312a via the blocking plate 315. The elastic conductor 317 is, for example, a spring and connected to the touch portion 316 to be located between the touch portion 316 and the blocking plate 315 along the axis A. When the touch portion 316 is pushed toward the back end 312b when exerting the stylus 310 by a user, the elastic conductor 317 is compressed between the blocking plate 315 and the touch portion 316. Thus, when no depressing force is applied on the stylus (as FIG. 4 showing), the touch portion 322 is recovered by an elastic force of the elastic conductor 317. In other embodiments, the elastic conductor 317 also could be an elastic metal slice or a magnet with a conductive formed plastic. Referring back to FIG. 3, the touch portion 316 is sliding disposed at the main body 312, when the touch portion 316 is applied to the display region 322 to generate a force on the touch portion 316. Then, the touch portion 316 will be driven to move toward the blocking plate 315 and compress the elastic conductor 317. The touch portion 316 is electrically connected to the battery by the elastic conductor 317 and the conductive pillar 316a and emits a light 50 continuously. Simultaneously, the magnitude of the force will be sensed by the pressure sensitive module consisted of detector 313a and emitting element 313b.

In this embodiment, the light 50 irradiated from the touch portion 316 is used for the light sensor array 326 embedded in the display device 320, not for detector 313a. The detector 313a fixed to a surface facing the touch portion 316 of the blocking plate 315 is responsive to the intensity of the light 70 while operating the stylus 310. The emitting element 313b emitting the light 70 is fixed to a pillar 316a of the touch portion 316. The detector 313a is used for detecting a light 70 emitted by the light emitting element 313b to obtain a variation of a distance between the light emitting element 313b and the light detector 313a. The distance is shortened while the force acted on the touch portion 316 is increased, and the light detector 313a is capable of transferring analog signals with the magnitude of the force accordingly. Therefore, the detector 313a and the emitting element 313b are regarded as a pressure sensitive module, responsive to the force exerted by the user while operating the stylus 310. The light 70 is only sensed by the detector 313a of the pressure sensitive module, because the irradiating direction of the light 70 is opposite to the one of light 50. The type of the detector 313a and emitting element 313b are not restricted, for example, the emitting element 313b can be an electromagnetic wave emitting element, such as LED, bulb, or laser, even other element emitting any invisible radiation, and the detector 313a must be a sensor capable of sensing the signal from the emitting element 313b, such as, a photo transistor, a photo diode, a photo-sensitive resistor and so on.

In another embodiment, the emitting element 313b is a magnetic element, the detector 313a is capable of detecting magnetic prosperity. In other words, the pressure sensitive module includes a magnetic element 313b and a magnetic detector 313a. The magnetic element 313b is fixed to the touch portion 316. The magnetic detector 313a is fixed to the blocking plate 315 and suitable for detecting a magnetic force generated between the magnetic detector 313a and the magnetic element 313b to obtain a variation of a distance between the magnetic element 313b and the magnetic detector 313a. The magnetic element 313b is, for example, a magnet or any object suitable for generating magnetic force and the detector 313a must be a sensor capable of sensing the signal from the magnetic element 313b.

The transducer module 318 disposed in the main body 312 is used to processing the signal from pressure sensitive module including detector 313a and emitting element 313b, and transforming the analog signal 70 into a digital format, wherein the intensity of the signal 70 is directly proportional to the magnitude of the force exerted by a user. The RF transmitting module 319 may be disposed at the back end 312b of the main body, or at the wall of the main body 312 and electrically connected to the transducer module 318. In one embodiment, the RF transmitting module 319 is used for transmitting digital signals within a predetermined frequency range, and the RF receiving module 324 disposed in the display device 320 is capable for receiving signals with the same specific frequency, such that other signal out of the specific frequency range regarded as an interference is prevented.

According to the present invention, the stylus is able to transmit an electrical signal directly proportional to a contact pressure applied to the touch portion of the stylus, and the display device is able to receive the electrical signal to display image according to its information. For example, a width of the line showed by the display device is able to be promptly changed by respective electrical signals transmitted from the stylus, such that the operation of the touch input system is more flexible. Therefore, in addition to the location touched by the stylus 310, the display region 322 shows line width responsive to the magnitude of the signal 70 while writing. The touch portion 316 is exerted on the display region 322 to generate the signals representing line width on the display region 322 by the wireless communication. The RF receiving module 324 is electrically connected to the display region 322 and receives the digital signal from the RF transmitting module 319 within a predetermined frequency range. The display region 322 is suitable for displaying a line width depicted by the user according to the signal 70 sensed by the detector 313a. In other words, the location and the width of the line are both displayed on the display device 320, the line width is changed by signals 70 and the line location is based on signal 50, such that the operation of the touch input system 300 is more flexible.

Figure 5:
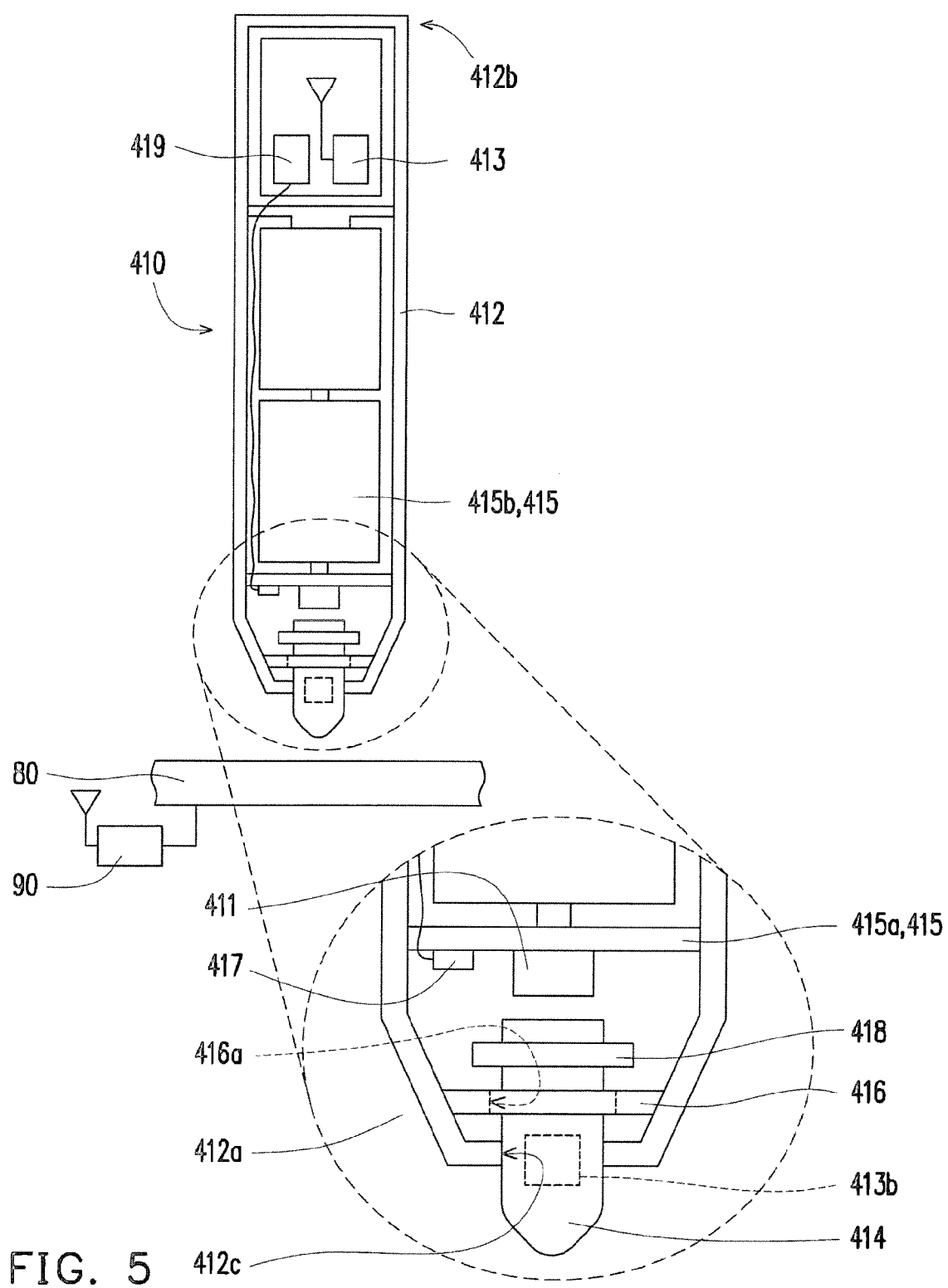
FIG. 5 illustrates a stylus according to further another embodiment of the present application.
Figure 6:
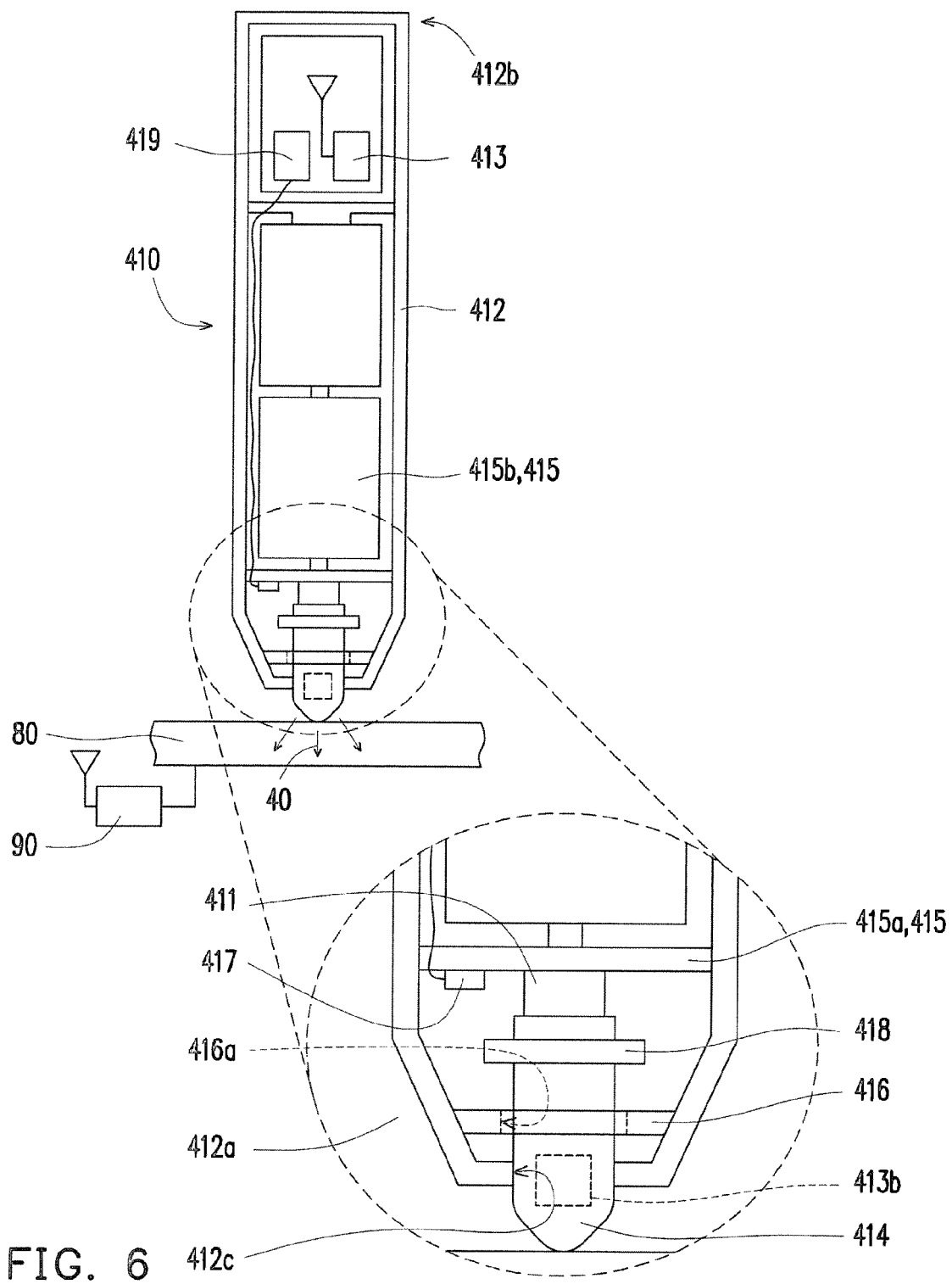
FIG. 6 illustrates the touch portion contacts the operation surface of FIG. 5.

FIG. 5 illustrates a stylus according to further another embodiment of the present application. FIG. 6 illustrates the touch portion contacts the operation surface of FIG. 5. Referring to FIG. 5 and FIG. 6, the stylus 410 includes a pipe 412, a touch portion 414, a first magnetic element (a fixed magnetic element) 416 and a second magnetic element (a moveable magnetic element) 418. The pipe 412 has a front end 412a, a back end 412b opposite to the front end 412a and an opening 412c formed at the front end 412a, wherein the diameter of the opening 412c is smaller than the diameter of the pipe 412. The touch portion 414 is sliding disposed at the opening 412c, wherein at least a part of the touch portion 414 is located in the pipe 412.

The first magnetic element 416 fixed to the inner wall of the pipe 412 and has an annular shape, in which the diameter of the through hole 416a is larger or substantially equal to the diameter of the opening 412c, such that the touch portion 414 sliding disposed at the opening 412c can penetrate the through hole 416a. The second magnetic element 418 and the touch portion 414 are bonded together, and regarded as a signal portion. When the depressing force is applied on the stylus, the touch portion 414 and the second magnetic element 418 may move together. Due to the size of the second magnetic element 418 is larger than the through hole 416a, the second magnetic element 418 is always between the conductive element 411 and the first magnetic element 416 whether the exertion force is applied or not. As shown by this example, the first magnetic element 416 is located between the second magnetic element 418 and the opening 412c. The exertion force is able to resist a magnetic attractive force generated between the first magnetic element 416 and the second magnetic element 418, at the same time, the second magnetic element 418 is driven to move away from the first magnetic element 416 (as FIG. 6 shown).

The stylus 410 further includes a battery module 415, a detector 417 and a converter 419. The battery module 415 is disposed in the pipe 412 and includes a blocking plate 415a and at least a battery 415b (showing two). The touch portion 414 is electrically connected to the battery module 415 and emits a light signal 40 actuating the operation surface 80. The detector 417 is suitable for detecting a magnetic force produced from the second magnetic element 418 to obtain an analog signal representing a variation of a distance between the second magnetic element 418 and the detector 417, and the above-mentioned distance is shortened while the contact pressure acted on the touch portion 414 is increased. The converter 419 disposed in the pipe 412 is electrically connected to the detector 417, and capable of transducing the analog signal into a digital signal and outputting the digital signal to the RF transmitting module 413. The RF transmitting module is essentially consisted of a RF transmitter and a transmitting antenna, and is suitable for transmitting the digital signal to the RF receiving module 90 by the wireless communication. In this embodiment, a conductive element 411 is disposed on the blocking plate 415a, and located between the blocking plate 415a and the touch portion 414. The conductive element 411, for example, a conductive sponge, would be compressed and electrically contact with the battery module 415. When the exertion force is stronger than the magnetic attractive force between the first and the second magnetic element (416 and 418), the touch portion 414 is electrically connected to the battery via the conductive element 411 and emits light 40. The magnetic attractive force is used for driving the touch portion 414 to recover from the state shown in FIG. 6 to the state shown in FIG. 5.

Figure 7:
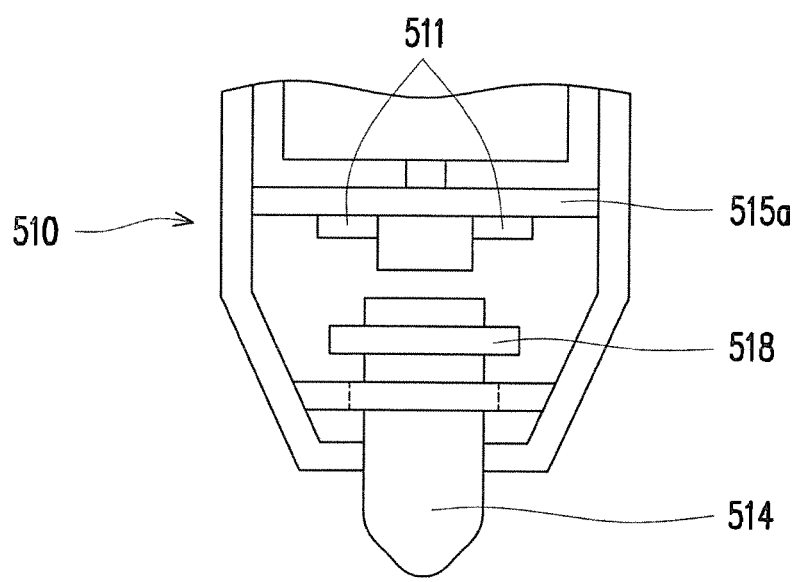
FIG. 7 partially illustrates a stylus according to further another embodiment of the present application.

In another embodiment, the conductive element 411 is not compressive, is just regarded as switch. A force exerted by a user is stronger than the magnetic attractive force of the two magnetic elements when writing, the touch portion 414 is electrically connected to the battery via the conductive element 411 and emits the light 40. Once the stylus is not been exerted, the conductive element 411 and the touch portion 414 will be separated by the magnetic attractive force of the two magnetic elements. The touch portion 414 may contact the operation surface 80 and emit light while the contact pressure being stronger than the magnetic attractive force of the two magnetic elements. In addition, the third magnetic element could be added to enhance the separation strength of the conductive element and the touch portion, the description detailed in FIG. 7. FIG. 7 partially illustrates a stylus according to further another embodiment of the present application. Comparing with the stylus 410 of FIG. 5, the stylus 510 of FIG. 7 further includes a third magnetic element 511. The third magnetic element 511 is disposed at the blocking plate 515a and facing the second magnetic element 518, wherein a magnetic repulsive force is generated between the second magnetic element 518 and the third magnetic element 511, such that a greater magnetic force is provided for the touch portion 514 to recover. In one example, the magnetic repulsive force acts as the elastic member to be recovered easily in order to make the style of drawing smooth and easily.

Figure 8:
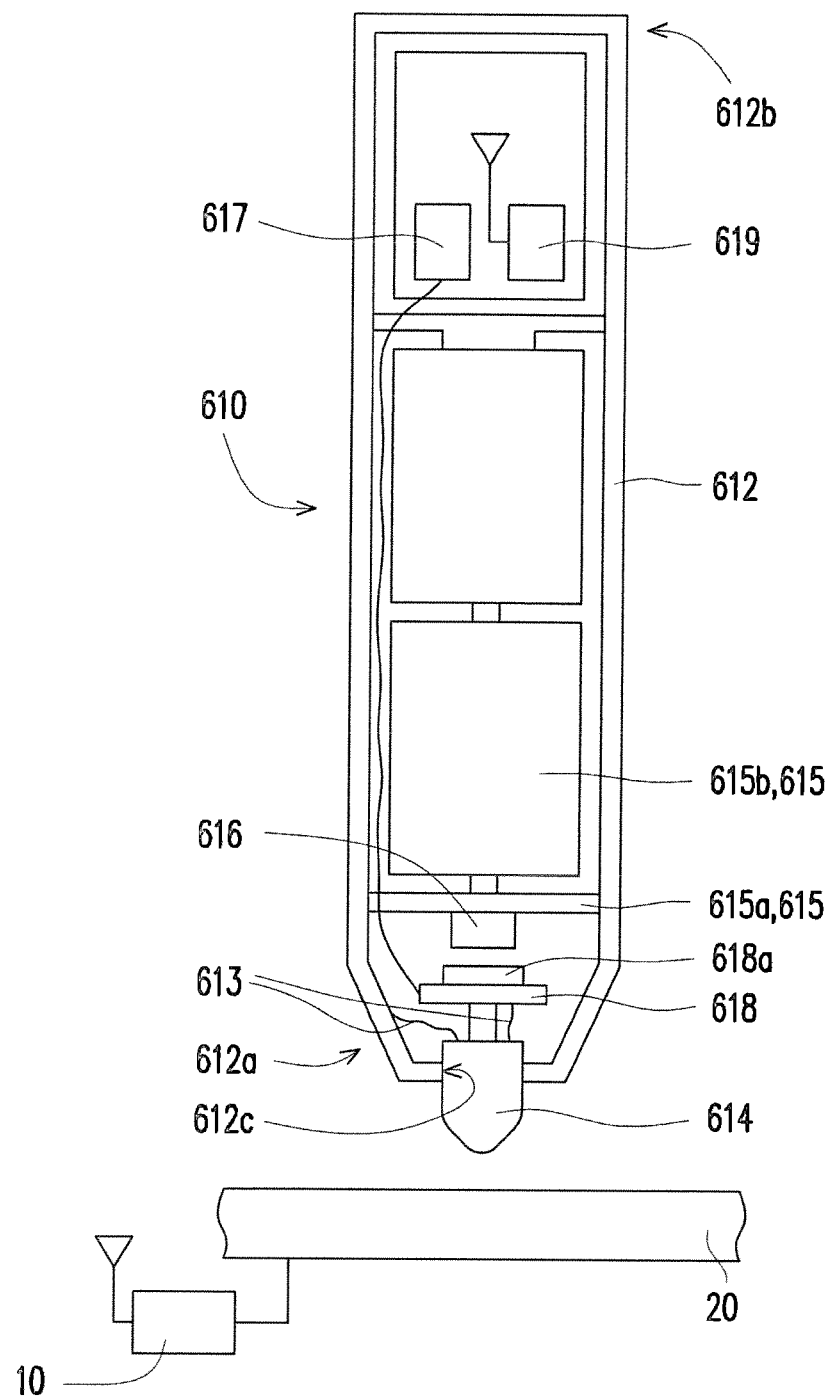
FIG. 8 illustrates a touch input system according to further another embodiment of the present application.
Figure 9:
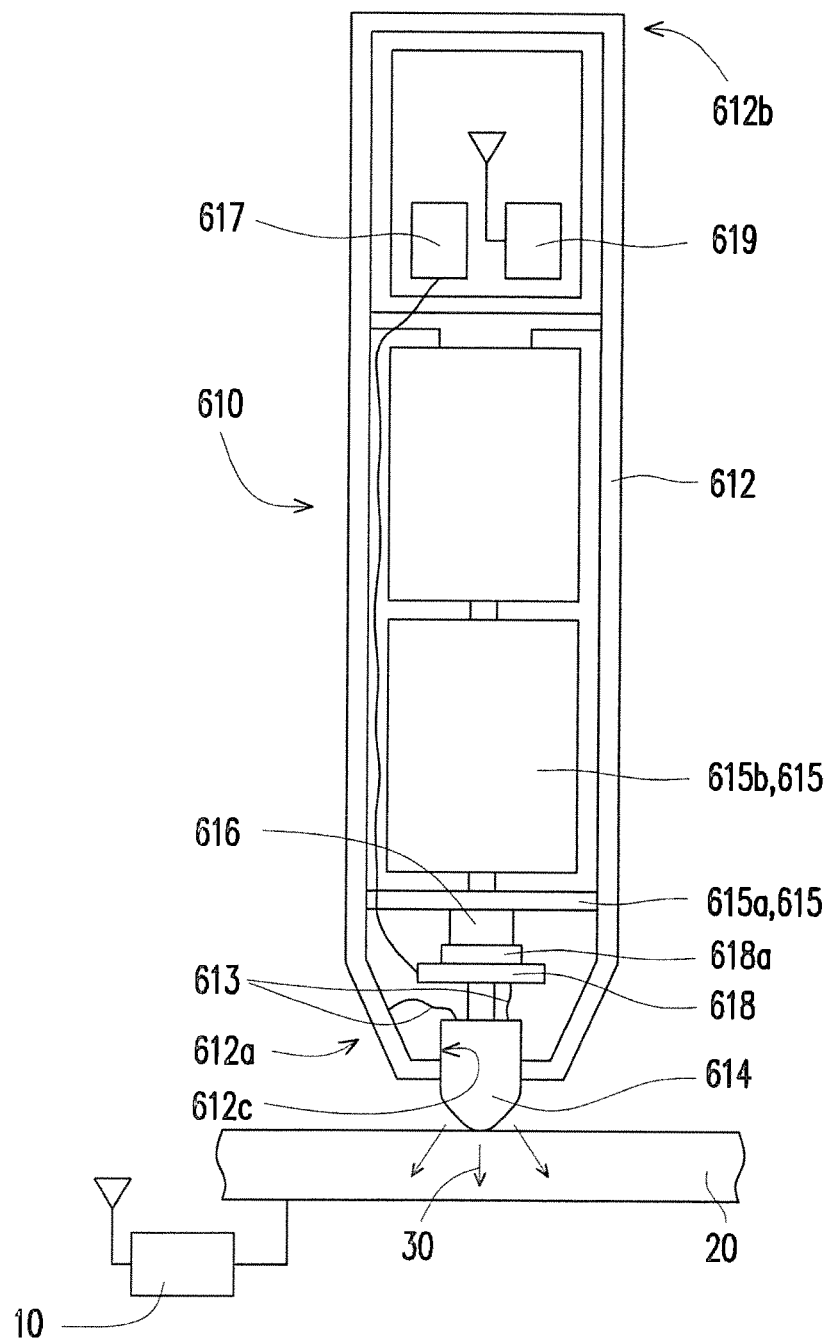
FIG. 9 illustrates the touch portion contacts the operation surface of FIG. 8.

FIG. 8 illustrates a stylus according to further another embodiment of the present application. FIG. 9 illustrates the touch portion contacts the operation surface of FIG. 8. Referring to FIG. 8 and FIG. 9, the stylus 610 includes a pipe 612, a touch portion 614, a protrusion 616 and a switch element 618. The pipe 612 has a front end 612a, a back end 612b opposite to the front end 612a and an opening 612e formed at the front end 612a, wherein a diameter of the opening 612c is smaller than a diameter of the pipe 612. The touch portion 614 is sliding disposed at the opening 612c, wherein at least a part of the touch portion 614 is located in the pipe 612.

The stylus 610 further includes a battery module 615 and a converter 617, and the protrusion 616. The battery module 615 is disposed within the pipe 612 and includes a blocking plate 615a and at least a battery 615b (showing two). The protrusion 616 is formed on the blocking plate 615a of the pipe 612 and can be screwed forward or backward to adjust the suitable distance between the protrusion 616 and the switch element 618. The switch element 618 is fixed and electrically connected to the touch portion 614 and has an elastic element 618a. When the touch portion 614 is driven to move toward the back end 612b by an exertion force, the switch element 618 is also pushed forward to contact the protrusion 616 for actuating the touch portion 614 to emit a light signal 30 actuating the operation surface 20 (as FIG. 9 shown). The switch element 618 comprises an elastic element 618a facing the protrusion 616 and the elastic element 618a is compressed between the touch portion 614 and the protrusion 616, such that an elastic force is provided by the elastic element to drive the touch portion 614 to recover from the state shown in FIG. 9 to the state shown in FIG. 8. For example, the protrusion 616 could also be an elastic element to provide a greater elastic force for the touch portion 614 to recover.

In FIG. 9, the switch element 618 is turned on by the protrusion 616, such that the touch portion 614 emits a light signal 30 actuating the operation surface 20. However, the light signal 30 is extinguished when the tip of stylus 610 leaves the operation surface 20, as FIG. 8 shown. For example, the exertion force applied to the touch portion 614 may be sensed by a detector (not shown), and the detecting mechanism is referring to other embodiment in the present invention. In other words, the detector fixed on the blocking plate 615a also can be added when the stylus is designed to combine the pressure-sensitive function to draw a variable line width by a user's exertion force. In some examples, the switch element 618 is not only a switch, but also integrates a detecting function. In other examples, the detector is embedded in the protrusion 616 such that the protrusion 616 is capable of sensing the level of the contact pressure. The contact pressure is generated between the operation surface 20 and the touch portion 614 when exerting and transmitted to the converter 617. The converter 617 is disposed in the pipe 612 and electrically connected to the protrusion 616, wherein the converter 617 is suitable for transducing the analog signal into a digital signal and outputting the digital signal to the RF transmitting module 619. The RF transmitting module 619 is essentially consisted of a RF transmitter and an antenna for transmitting depressing pressure information. The RF transmitting module 619 is arranged to send the digital signal to the RF receiving module 10 electrically connected to the operation surface 20.

In one embodiment, the protrusion 616 is, for example, screwed to the blocking plate 615a, and a user can rotate the protrusion 616 to adjust a distance between the protrusion 616 and the switch element 618. In some embodiments, the protrusion 616 is designed in a constant distance at the manufacturing stage. The switch element 618 is, for example, electrically connected to the battery module 615 and the touch portion 614 by conductive wires 613. In addition, the switch element 618 has two contacts in a Surface Mount Device (SMD) or four contacts in a Dual In-line Package (DIP).

Figure 10:
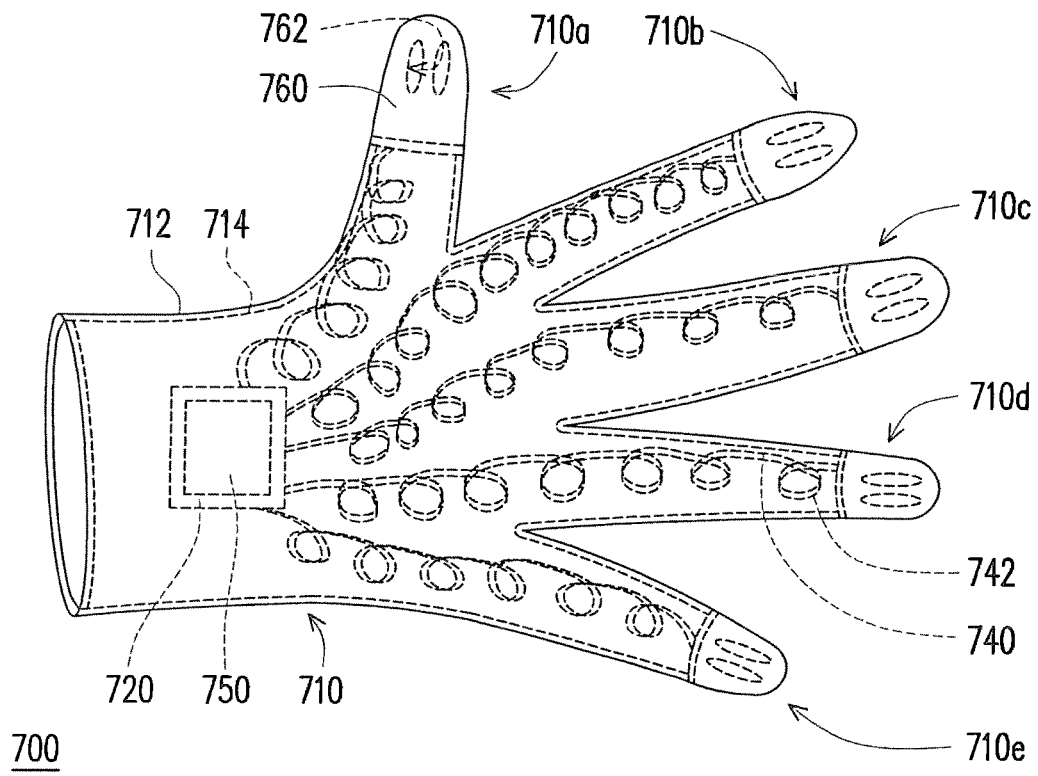
FIG. 10 illustrates a light emitting glove according to an embodiment of the present application.
Figure 11:
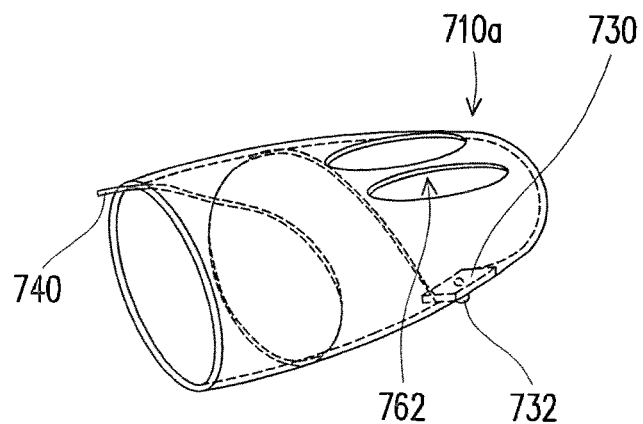
FIG. 11 illustrates a finger portion of the light emitting glove of FIG. 10.

FIG. 10 illustrates a light emitting glove according to an embodiment of the present application. FIG. 11 illustrates a finger portion of the light emitting glove of FIG. 10. Referring to FIG. 10 and FIG. 11, the light emitting glove 700 includes a glove 710, a control circuit board 720, a plurality of light emitting elements 730 and a plurality of connecting wires 740.

The glove 710 includes an outer layer 712 and an inner layer 714 and having a plurality of finger portions 710a~710e (FIG. 10 illustrates finger portion 710a). The control circuit board 720 is disposed between the outer layer 712 and the inner layer 714. The light emitting elements 730 are, for example, light emitting diode elements and disposed on the finger portions 710a~710e respectively, wherein each of the light emitting elements 730 has a micro switch assembly 732. The connecting wires 740 are disposed between the outer layer 712 and the inner layer 714, wherein the light emitting elements 730 are electrically connected to the control circuit board 720 by the connecting wires 740 respectively.

A user can wear the light emitting glove 700 and touch a display panel by the finger portions 710a~710e. When one or more of the finger portions 710a~710e contact(s) the above mentioned the display panel, the corresponding micro switch assemblies 732 are pressed, and the corresponding light emitting elements 730 are driven to emit light for executing a touch input function. The touch input manner described in FIG. 1 to FIG. 9 can be applied to the micro switch assembly 732 described here.

In this embodiment, the light emitting glove 700 further includes a battery 750 and a plurality of rubber layers 760. The battery 750 is disposed on the control circuit board 720 for providing electric power to the control circuit board 720 and the light emitting elements 730. The rubber layers 760 covers the ends of the finger portions 710a~710e respectively and each of the rubber layers 760 has at least one (showing two) heat dissipation opening 762 for dissipating the heat generated by the corresponding light emitting element 730 or user's hand.

Referring to FIG. 10, each of the connecting wires 740 has a plurality of curled portions 742 for being flexible, such that the user wearing the light emitting glove 700 can crook his fingers without pulling apart the connecting wires 740. In this embodiment, each of the curled portions 742 is flattened between the outer layer 712 and the inner layer 714 in order not to occupy the inner space of the glove 710.

Figure 12:
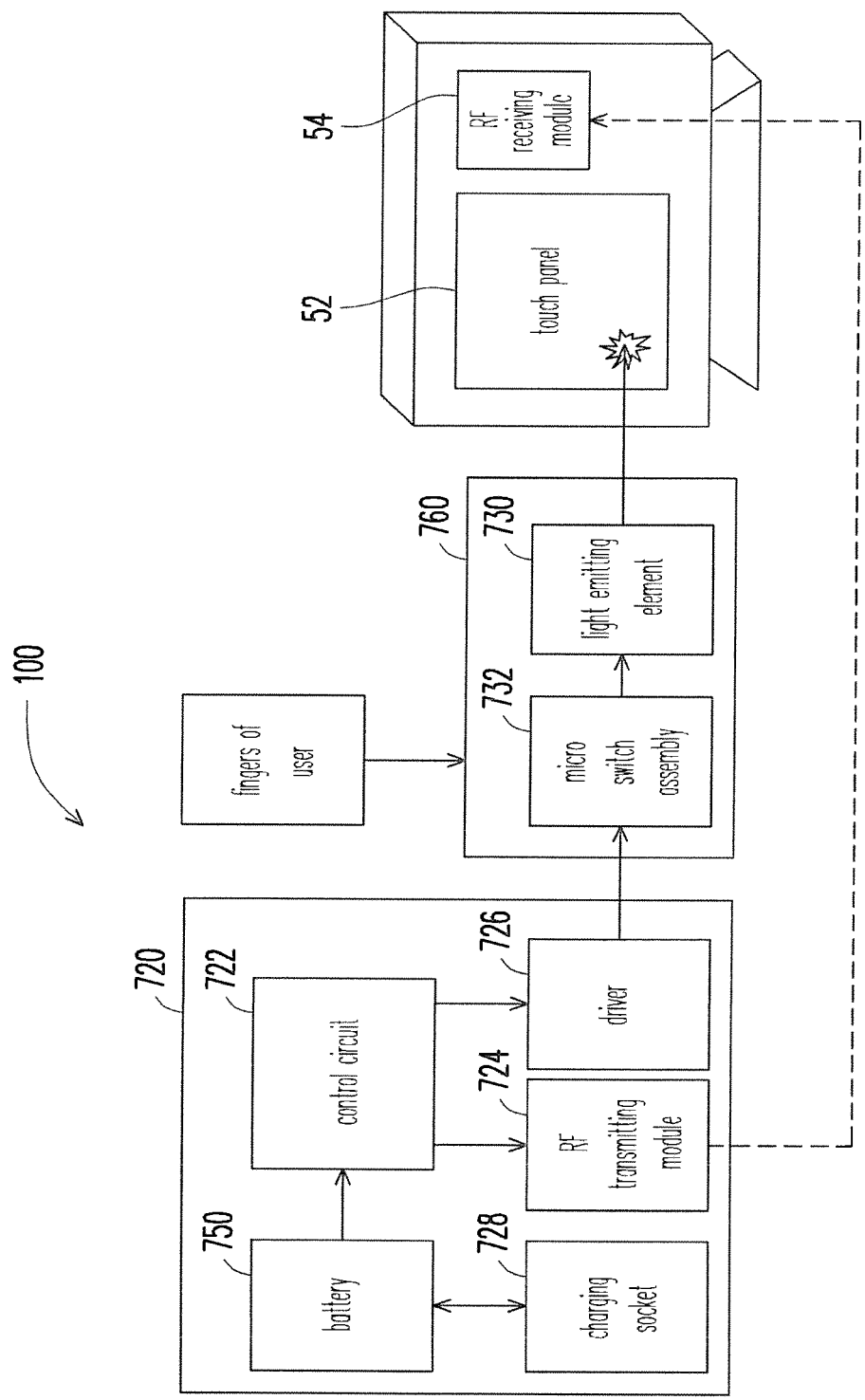
FIG. 12 illustrates an operating manner of the light emitting glove of FIG. 10.

FIG. 12 illustrates an operating manner of the light emitting glove of FIG. 10. Referring to FIG. 12, the control circuit board 720 includes a control circuit 722, an RF transmitting module 724 electrically connected to the control circuit 722, a driver 726 electrically connected to the control circuit 722 and a charging socket 724 for the battery 750 to be charged. The battery 750 provides electric power to the control circuit 722. The control circuit 722 drives the RF transmitting module 728 to transmit an RF signal to the RF receiving module 54 of the electronic device 50, such that a touch input function of a touch panel 52 of the electronic device 50 is turned on.

When a user wearing the light emitting glove 100 contacts a touch panel 52 of an electronic device 50 by fingers, the micro switch assembly 732 is pressed, and the control circuit 722 drives the light emitting element 730 to emit light by the driver 726, and the touch panel 52 receives the light emitted by the light emitting element 730, such that a touch input function is executed. Those skilled in the art should appreciate that any of the aforementioned embodiments and combinations could be applied in the finger portions 710a-710e.

In summary, the stylus of the present invention is able to transmit an electrical signal directly proportional to a contact pressure applied to the touch portion of the stylus, and the display device is able to receive the electrical signal to display a line width according to the electrical signal. In other words, a width of the line displayed by the display device is able to be changed by different electrical signals transmitted from the stylus, such that the operation of the touch input system is more flexible. In addition, when the touch portion of the stylus contacts an operation surface and a contact pressure is applied to the touch portion, the touch portion is pushed toward and electrically connected to the battery module to emit light signal actuating the operation surface, such that the operation of the stylus is facilitated.

It will be apparent to those skilled in the art that various modifications and variations may be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A stylus, comprising:
   a housing, has a front end, a back end opposite to the front end and an opening formed at the front end;
   a battery module, disposed in the housing and having a blocking plate facing the front end;
   a touch portion, sliding disposed at the opening along an axis, wherein the touch portion is suitable for contacting an operation surface to move into the housing;
   a detector, fixed to the blocking plate and suitable for detecting a motion of the touch portion to obtain an analog signal;
   a light emitting element, fixed to the touch portion and suitable for moving along the axis by the motion of the touch portion; and
   an elastic element, disposed between the blocking plate and the touch portion and located on the axis, wherein when the touch portion contacts the operation surface to move into the housing, the elastic element is compressed between the blocking plate and the touch portion, such that touch portion is electrically connected to the battery module and emits a light signal continuously, when the touch portion is distant from the operation surface, the touch portion is recovered by an elastic force of the elastic element, such that the electrical connection between the touch portion and the battery module is terminated,
   wherein the detector is suitable for detecting a light emitted by the light emitting element, and the light emitted by the light emitting element is suitable for actuating a light sensor disposed at the operation surface.

2. The stylus as claimed in claim 1, wherein the light emitting element is disposed in the touch portion.

3. The stylus as claimed in claim 1, further comprising:
a pillar, fixed to the touch portion and extending toward the blocking plate, wherein the light emitting element is fixed to the pillar.

4. The stylus as claimed in claim 1, further comprising:
a RF transmitting module; and
a converter, electrically connected to the detector and the RF transmitting module, wherein the converter is suitable for converting the analog signal into a digital signal and transferring the digital signal to the RF transmitting module.

5. The stylus as claimed in claim 1, wherein the blocking plate has a surface facing the touch portion, and the detector is disposed on the surface.

6. The stylus as claimed in claim 1, wherein an end of the elastic element is connected to the touch portion, and when the touch portion moves into the housing, another end of the elastic element is contacted the blocking plate and compressed.

7. The stylus as claimed in claim 1, further comprising:
a magnetic element, fixed to the touch portion and suitable for moving along the axis by the motion of the touch portion, wherein the detector is suitable for detecting a magnetic force generated by the magnetic element.

* * * * *